(12) United States Patent
Ruttle

(10) Patent No.: US 12,721,334 B2
(45) Date of Patent: Sep. 1, 2026

(54) BEAR SPRAY DEVICE

(71) Applicant: Scott Colin Ruttle, Garibaldi Highlands (CA)

(72) Inventor: Scott Colin Ruttle, Garibaldi Highlands (CA)

( * ) Notice: Subject to any disclaimer, the term of this patent is extended or adjusted under 35 U.S.C. 154(b) by 0 days.

(21) Appl. No.: 19/013,696

(22) Filed: Jan. 8, 2025

(65) Prior Publication Data

US 2026/0191184 A1 Jul. 9, 2026

(51) Int. Cl.
*A01M 29/12* (2011.01)

(52) U.S. Cl.
CPC .................................. *A01M 29/12* (2013.01)

(58) Field of Classification Search
CPC ...... A01M 29/12; A01M 29/16; A01M 29/18; A01M 29/00; B05B 9/04; B05B 12/004; B05B 12/0022; B05B 12/00; B05B 12/002; B05B 12/0024; B05B 12/0026
USPC ........... 119/712; 239/222, 72, 526, 529, 573
See application file for complete search history.

(56) References Cited

U.S. PATENT DOCUMENTS 5,388,730 A * 2/1995 Abbott .................. B65D 83/20 222/321.2
5,971,230 A * 10/1999 Tanaka .................. B65D 83/20 222/402.1
7,249,692 B2 * 7/2007 Walters ............... B05B 11/1014 222/402.15
7,753,237 B2 * 7/2010 Tsai ..................... B65D 83/182 222/323
8,904,968 B1 * 12/2014 Nelson ................ A01M 31/002 119/720
9,072,289 B1 * 7/2015 Lucas ...................... F41H 9/10
10,589,304 B1 * 3/2020 Haigh .................. B05B 12/002
11,142,390 B1 * 10/2021 Freudenberg ......... B05B 1/1645
2003/0218029 A1 * 11/2003 Brody ................. B65D 83/182 222/402.15
2005/0211733 A1 * 9/2005 Healy ................. B65D 83/184 222/402.1
2005/0279288 A1 * 12/2005 Neri ...................... A01K 15/02 119/712
2009/0294615 A1 * 12/2009 Huang ................ B65D 83/182 248/229.22
2010/0051652 A1 * 3/2010 Becker ................ B65D 83/182 222/472
2010/0155399 A1 * 6/2010 Wilson ..................... A61L 2/22 220/87.2

(Continued)

*Primary Examiner* — Zoe Tam Tran
(74) *Attorney, Agent, or Firm* — Orin Del Vecchio

(57) ABSTRACT

A bear spray device that is provided in a first embodiment and a second embodiment wherein both embodiments are constructed to provide emission of an audio signal ensuing removal of the trigger guard of a bear spray canister. The first embodiment is a trigger guard embodiment that is configured to be releasably secured to a trigger of a bear spray canister. A nozzle assembly embodiment is further provided wherein the nozzle assembly embodiment is operably coupled to a canister of bear spray and will provide discharge of spray disposed therein. Both embodiments include a sensor to detect removal of the trigger guard wherein subsequent removal of the trigger guard the audio member broadcasts an audio signal within a preferred decibel range. The embodiments include an integral power supply providing operation thereof. The trigger guard embodiment includes a cover member providing protection of the operational elements.

5 Claims, 2 Drawing Sheets

(56) References Cited

U.S. PATENT DOCUMENTS

2010/0269762 A1* 10/2010 Johnson .................... F41H 9/10
222/394
2013/0001323 A1* 1/2013 Bodet .................... B65D 83/22
239/337
2013/0055996 A1* 3/2013 Perry ...................... F41B 11/62
124/56
2013/0099900 A1* 4/2013 Pulvermacher ....... B05B 11/108
340/10.42
2017/0318797 A1* 11/2017 Smith ................... A01M 29/18
2021/0198029 A1* 7/2021 Baek ...................... B65D 83/24
2024/0024157 A1* 1/2024 Mercier ................ A61F 9/0008

* cited by examiner

BEAR SPRAY DEVICE

FIELD OF THE INVENTION

The present invention relates generally to wildlife protection devices, more specifically but not by way of limitation, a bear spray device wherein the present invention includes two embodiments with both embodiments configured to emit an audio signal prior to discharge of the repellant spray.

BACKGROUND

Bear spray, a type of pepper spray designed specifically for deterring bear attacks, has become an essential safety tool for anyone venturing into bear habitats. With bear populations growing in many regions and human activity increasingly encroaching on their territories, the need for effective measures to prevent dangerous encounters has never been more urgent. Bear spray is a specialized aerosol canister that contains capsaicin, the active ingredient in pepper spray, which is known for causing temporary irritation to the eyes, skin, and respiratory system. It is designed to be used as a non-lethal deterrent in the event of an aggressive bear encounter. Unlike firearms, which pose the risk of killing or seriously injuring the animal, bear spray provides a safer and more humane way to discourage bears from attacking. The importance of bear spray stems from its ability to give individuals the necessary tools to protect themselves while minimizing harm to the animal, which is essential for the conservation of bear species and their ecosystems.

Bears are powerful, unpredictable animals, capable of reacting aggressively when they feel threatened, cornered, or surprised. In areas where human activity and bear habitats overlap—such as national parks, forests, and mountainous regions—encounters between the two are more frequent. Although most bear encounters do not result in attacks, there remains a genuine risk, particularly when bears are startled, hungry, or protecting their young. While current bear sprays have proven to be effective, additional deterrents in conjunction with the bear spray could improve the probability of a positive outcome for bear human interactions.

Accordingly, there is a need for a bear spray device that is configured to provide emission of an audio signal providing notification of the removal the trigger guard ensuring alert to the user that the trigger for the bear spray device is exposed for use.

SUMMARY OF THE INVENTION

It is the object of the present invention to provide a device configured to deter a bear wherein the device includes a trigger guard embodiment and a replacement nozzle assembly embodiment.

Another object of the present invention is to provide a bear deterrent device that is configured to facilitate emission of an audio signal upon removal of the trigger guard wherein the trigger guard embodiment includes a housing that has an upper portion and a lower portion with a void therebetween.

A further object of the present invention is to provide a device configured to provide deterrence of a bear wherein the present invention includes an audio generation element disposed in an integrated compartment.

Yet a further object of the present invention is to provide a bear deterrent device that is configured to facilitate emission of an audio signal alert upon removal of the trigger guard wherein the present invention includes a sensor disposed in an integrally formed sensor compartment.

Still another object of the present invention is to provide a device configured to provide deterrence of a bear wherein the present invention further includes an integral power supply.

An additional object of the present invention is to provide a bear deterrent device that is configured to facilitate emission of an audio signal alert upon removal of the trigger guard wherein the housing includes channels formed therein to accommodate electrical wiring.

Yet a further object of the present invention is to provide a device configured to provide deterrence of a bear wherein the present invention provides an audio signal emission subsequent removal of the trigger guard for both embodiments of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
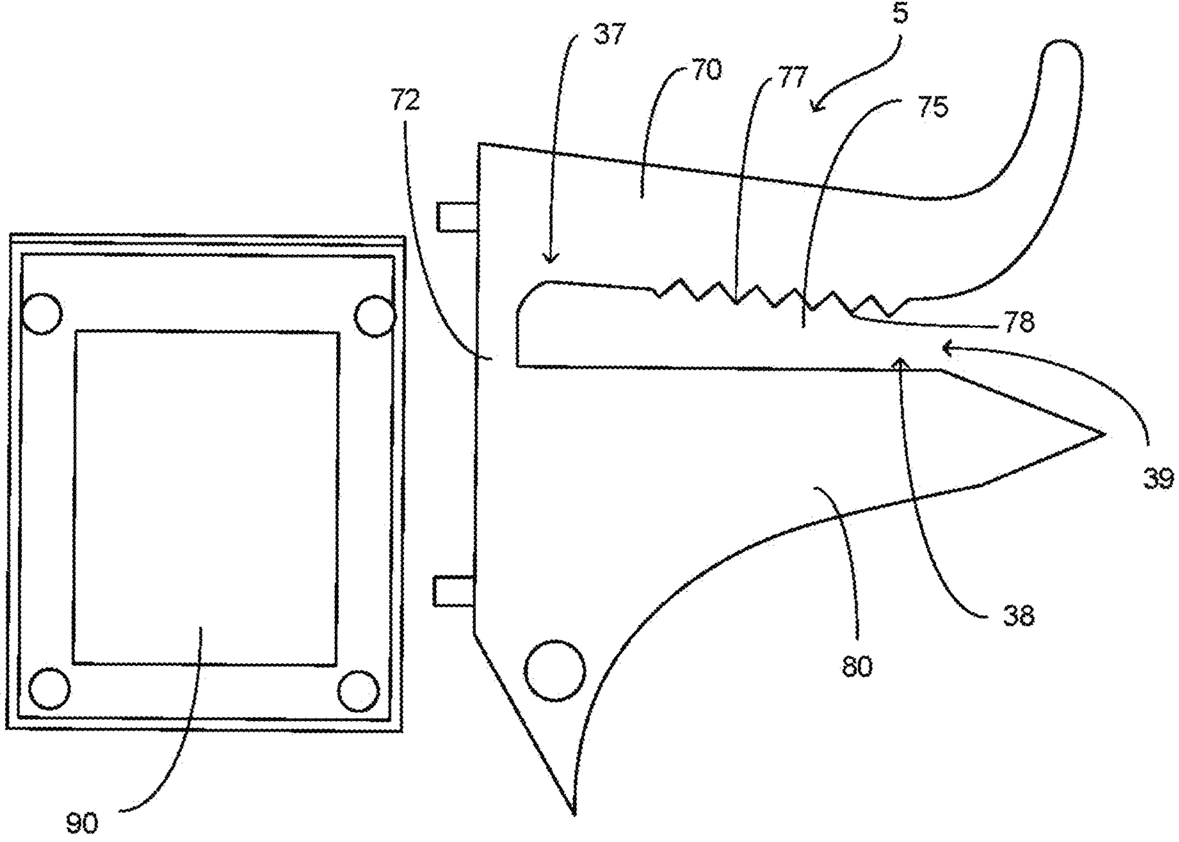
FIG. 1 is a side view of a trigger guard embodiment of the present invention.

Referring now to the drawings submitted herewith, wherein various elements depicted therein are not necessarily drawn to scale and wherein through the views and figures like elements are referenced with identical reference numerals, there is illustrated a bear spray device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to “an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the bear spray device 100 as is further discussed herein is configured to provide emission of an audio signal upon removal of the trigger guard 5 wherein the sound will emit until the trigger guard 5 is returned to its initial position wherein the trigger guard 5 inhibits operation of the trigger 7. It is contemplated within the scope of the present invention that the trigger guard embodiment (illustrated herein in FIG. 1) can be releasably secured to existing conventional bear spray canisters. The nozzle assembly embodiment (illustrated herein in FIG. 2) is configured to be operably coupled to a bear spray canister and provide discharge of the spray contained therein. Both embodiments are comprised of the same operational elements to produce the audio signal and as such the discussion herein for the nozzle assembly embodiment should be understood to apply to the trigger guard embodiment.

Figure 2:
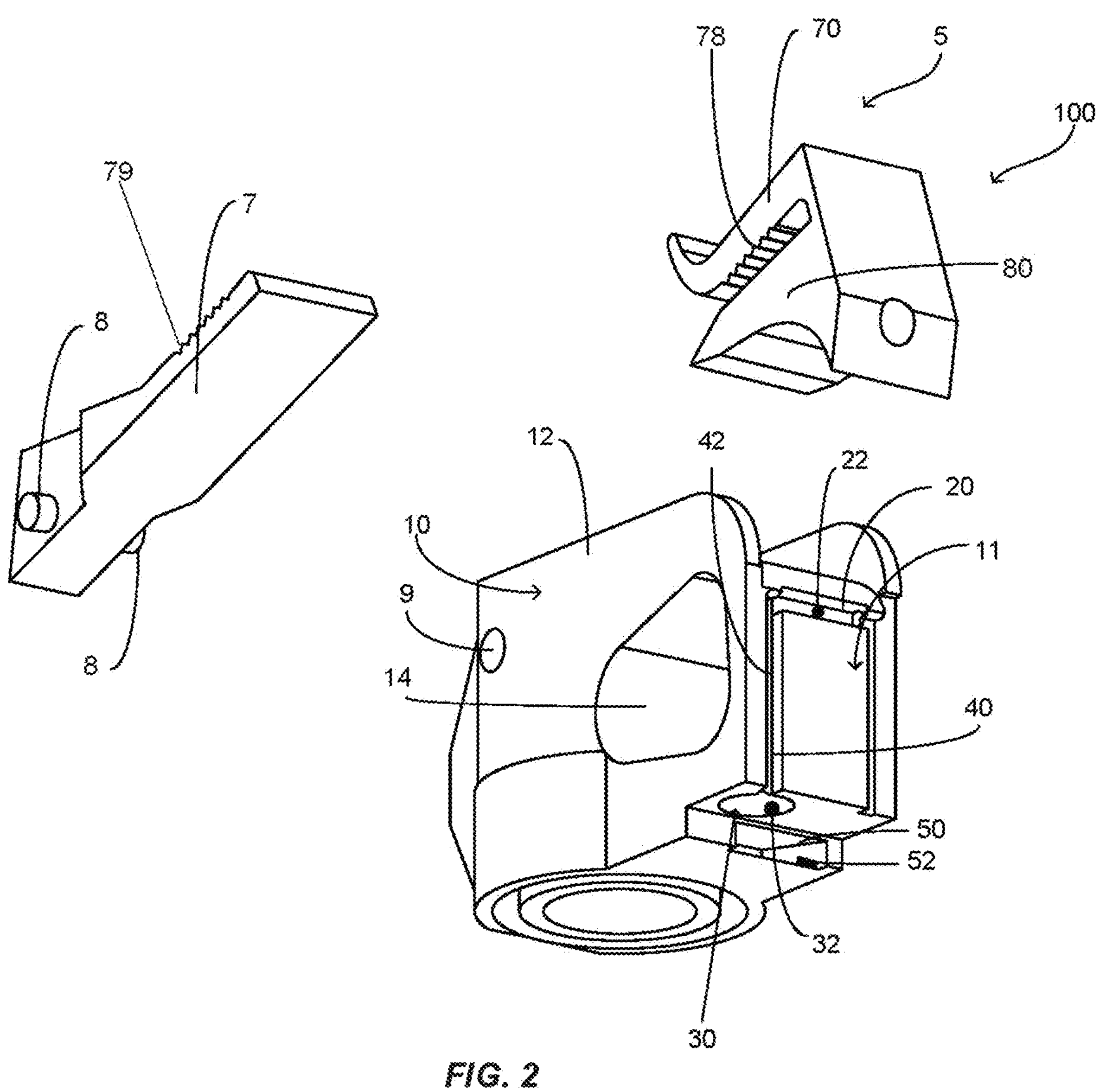
FIG. 2 is a bottom perspective view of a nozzle assembly embodiment of the present invention.

Referring in particular to FIG. 2 submitted herewith, the bear spray device 100 includes a housing 10. The housing 10 includes an upper portion 12 wherein the upper portion 12 includes aperture 14. Aperture 14 is sized so as to accommodate a human finger therein for gripping and operation of the bear spray device 100. The trigger 7 is pivotally secured in the upper portion 12 of the housing 10 wherein pins 8 are operably coupled with opposing apertures 9. Trigger 7 is configured to be depressed subsequent removal of the trigger guard 5 to facilitate discharge of spray from a canister (not illustrated herein) to which the bear spray device 100 is operably coupled.

Formed on the front 11 of the housing 10 is sensor compartment 20. Sensor compartment 20 includes a void having a sensor 22 mounted therein wherein the sensor 22 is operably coupled with the trigger guard 5 and detects removal thereof. It should be understood within the scope of the present invention that the sensor 22 can be constructed from a magnetic switch that moves the circuit between the sensor 22 and audio member 32 to a closed position upon removal of the trigger guard 5. It should be understood within the scope of the present invention that the sensor 22 and audio member 32 could be operably coupled utilizing numerous suitable techniques. The sensor 22 disposed within the interior volume of sensor compartment 20 is operably coupled to the audio member 32 disposed within the interior volume of the audio compartment 30. The audio member 32 is a conventional speaker or other similar device that is configured to emit a sound within a decibel range of fifty to one hundred decibels. It should be understood within the scope of the present invention that the decibel range of the audio member 32 could be lower or higher than the preferred range disclosed herein. The audio member 32 is operably coupled to the sensor 22 utilizing wires 42 disposed in channels 40. It should be understood within the scope of the present invention that the audio member 32 could be operably coupled to the sensor 22 utilizing various alternate suitable techniques.

The bear spray device 100 is powered by a power source 52 that is stored in a compartment 50. It should be understood within the scope of the present invention that the power source could be various suitable power sources such as but not limited to a battery. The trigger guard 5 includes an upper portion 70 and lower portion 80 having front wall 72 forming an operable coupling thereof. A void 75 is present the upper portion 70 and lower portion 80. Void 75 includes a first end 37 and second end 38 having an opening 39 proximate second end 38. Opening 39 is configured to receive trigger 7 therein wherein trigger 7 is journaled substantially into the void 75. Surface 77 has a plurality of retaining teeth 78 formed therein wherein the retaining teeth 78 are configured to operably couple with the retaining teeth 79 so as to releasably secure the trigger guard 5 in position. A user must exert sufficient force to remove the trigger guard 5 in order to initiate activation of the audio member 32. In regards to the trigger guard embodiment illustrated herein in FIG. 1, a cover member 90 is provided to provide protection of the operational elements present in the front wall 72. The operational elements for the trigger guard embodiment are the sensor 22, audio member 32 and power source 52 which are identical to the nozzle assembly embodiment discussed herein. Cover member 90 is secured across front wall 72 being mateable in shape thereto providing protection of the operational elements. While not particularly illustrated herein, it is contemplated within the scope of the present invention that the audio member 32 could have a volume control operably coupled thereto providing adjustment of the volume within the capable decibel range. Furthermore, it is additionally contemplated within the scope of the present invention that a light emitting device could be present and configured to emit a light upon removal of the trigger guard 5. Lastly, a vibration module could be operably coupled to the present invention and configured to provide a vibratory notification that the trigger guard 5 has been removed.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A nozzle assembly configured to be operably coupled to a canister of bear spray wherein the nozzle assembly comprises:
   a housing, said housing having an upper portion and a lower portion, said upper portion having an aperture formed therein, said lower portion of said housing configured to operably couple with the canister, said housing having a front portion;

an audio compartment, said audio compartment being formed in said front portion of said housing, said audio compartment having an interior volume, said audio compartment having an audio member disposed in the interior volume of said audio compartment, said audio member configured to emit an audio signal;

a sensor compartment, said sensor compartment being formed in the front portion of said housing, said sensor compartment having an interior volume with a sensor disposed therein, said sensor being operably coupled to said audio member, said sensor being operably coupled to a trigger guard so as to detect a removal thereof; and wherein the audio member broadcasts an audio signal subsequent the removal of the trigger guard from the housing.

2. The nozzle assembly configured to be operably coupled to a canister of bear spray as recited in claim 1, wherein said front portion of said housing further includes at least one channel formed therein, said at least one channel operably coupling said audio compartment and said sensor compartment provide sufficient space for wires therein.

3. The nozzle assembly configured to be operably coupled to a canister of bear spray as recited in claim 2, and further including a power storage compartment, said power storage compartment being formed in the front portion of the housing having an interior volume with a power supply stored therein.

4. The nozzle assembly configured to be operably coupled to a canister of bear spray as recited in claim 3, wherein the trigger guard is operably coupled to a trigger, said trigger guard being releasably secured to said housing, said trigger guard inhibiting operation of the trigger when coupled to said housing.

5. The nozzle assembly configured to be operably coupled to a canister of bear spray as recited in claim 4, wherein the audio member emits an audio signal within a decibel range of 50 to 100 decibels.

* * * * *